(12) United States Patent
Howe et al.

(10) Patent No.: US 8,218,438 B1
(45) Date of Patent: *Jul. 10, 2012

(54) REGULATING TRAFFIC FLOW IN A NETWORK DEVICE

(75) Inventors: Jeffrey Howe, West Chicago, IL (US); Steve Sanders, Hinckley, IL (US); Randy Olenz, Naperville, IL (US); Steven Krapp, Naperville, IL (US)

(73) Assignee: ARRIS Group, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/702,434

(22) Filed: Feb. 9, 2010

Related U.S. Application Data

(63) Continuation of application No. 11/594,304, filed on Nov. 8, 2006, now Pat. No. 7,660,250.

(60) Provisional application No. 60/734,737, filed on Nov. 8, 2005.

(51) Int. Cl.
*H04L 12/26* (2006.01)
*H04L 12/56* (2006.01)

(52) U.S. Cl. .................................................. 370/230.1

(58) Field of Classification Search ................... None
See application file for complete search history.

(56) References Cited

U.S. PATENT DOCUMENTS

| | | | | |
|---|---|---|---|---|
| 6,801,500 | B1 * | 10/2004 | Chandran | 370/230.1 |
| 6,970,426 | B1 * | 11/2005 | Haddock | 370/235.1 |
| 7,020,143 | B2 * | 3/2006 | Zdan | 370/395.21 |
| 7,126,913 | B1 * | 10/2006 | Patel et al. | 370/230.1 |
| 7,203,963 | B1 * | 4/2007 | Wu et al. | 726/23 |
| 7,369,489 | B1 * | 5/2008 | Bhattacharya et al. | 370/230 |
| 2007/0076621 | A1 * | 4/2007 | Malhotra et al. | 370/252 |
| 2007/0115817 | A1 * | 5/2007 | Gupta et al. | 370/230 |

* cited by examiner

*Primary Examiner* — Min Jung
(74) *Attorney, Agent, or Firm* — Troy A. Van Aacken; Robert J. Starr

(57) ABSTRACT

A token bucket instantiation regulate packets in a traffic flow stream based on a predetermined peak traffic flow rate. The token bucket size is nominally set to zero. An evaluation is made at a device that has received a given packet. The packet is considered conforming and is passed from the device if the token depth of the bucket is zero or greater. The token depth is decreased by the number of byes in the packet that was passed. The token depth is continuously replenished at a predetermined token rate until the predetermined bucket size is attained (the bucket is full). A received packet is deemed nonconforming if the token depth is less than zero; the nonconforming packet is not passed but is processed according to non-conforming criteria. Token bucket instantiations may be implemented in hardware, software or firmware for each traffic flow to regulate traffic to a given user.

17 Claims, 3 Drawing Sheets

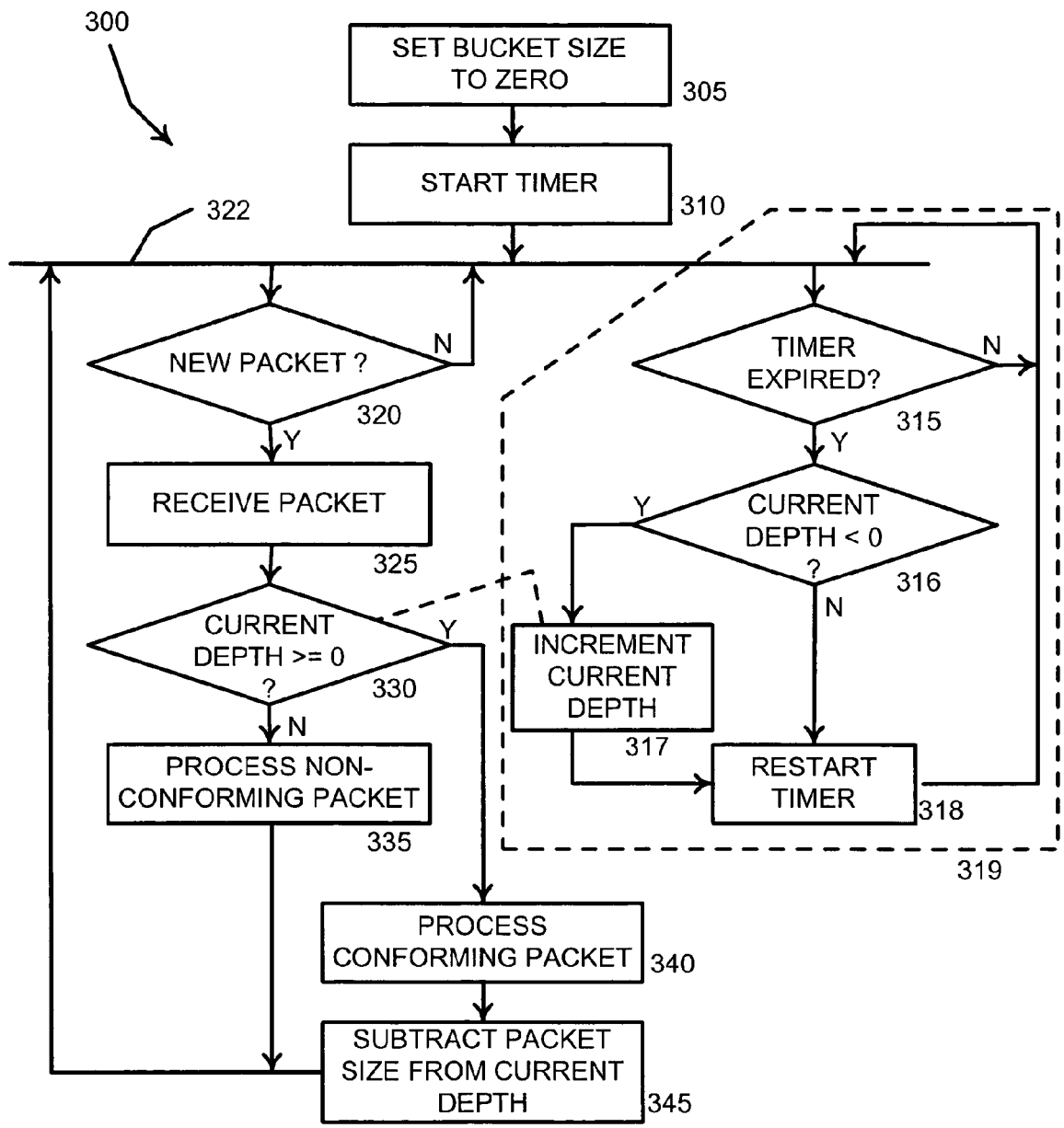

REGULATING TRAFFIC FLOW IN A NETWORK DEVICE

CROSS REFERENCE TO RELATED APPLICATION

This application is a continuation of U.S. patent application Ser. No. 11/594,304, entitled "Method and System for Regulating Traffic in a Network Device," filed Nov. 8, 2006, now U.S. Pat. No. 7,660,250, issued Feb. 9, 2010, and which claims priority under 35 U.S.C. 119(e) to Howe, U.S. provisional patent application No. 60/734,737 entitled "Multi-tier rate policing/shaping for broadband systems," which was filed Nov. 8, 2005, both of which are incorporated herein by reference in its entirety.

TECHNICAL FIELD

The present disclosure relates generally to traffic regulation in broadband communication networks.

BACKGROUND

Cable data systems are used to allow cable TV subscribers use the Hybrid-Fiber-Coax network as a communication link between their home networks and the Internet. As a result, computer information (Internet Protocol packets) can be transmitted across the Hybrid-Fiber-Coax network between home computers and the Internet. The Data Over Cable Service Interface Specification ("DOCSIS")—defined by CableLabs®—specifies the set of protocols that must be used to effect a data transfer across the Hybrid-Fiber-Coax network ("HFC"). Two fundamental pieces of equipment facilitate this data transfer: a cable modem ("CM") which is positioned in the subscriber's home, and a Cable Modem Termination System ("CMTS") which is positioned in the head end of the cable TV company.

In addition to data traffic, subscribers are more and more obtaining telephony voice services over networks other than the traditional public switched telephony network ("PSTN"). A multiple services operator ("MSO") may provide such telephony services, in addition to data over cable service via DOCSIS. For example, CableLabs has established the PacketCable™ standard for providing telephony services over cable. A subscriber typically has a device that includes a DOCSIS cable modem for transmitting and receiving data and a media terminal adaptor ("MTA"), or embedded MTA ("eMTA") for processing voice traffic for transmission and reception over cable.

Depending on the type of traffic passing through a CMTS, various methods may be used to regulate traffic. For example, a leaky bucket, a term known in the art analogous to a bucket having a hole that rejects water from storage therein when full and when an intake flow rate exceeds a discharge flow rate, may be used to reject queuing of data packets when a storage buffer is full and the intake rate exceeds the outflow rate. When used in a packet regulating environment, a leaky bucket instantiation may be used to reject packets when the bucket is full.

A similar, but different, instantiation is known in the art as a token bucket. A token bucket can conceptually be viewed as a bucket that is filled with tokens, where each token represents a byte. The bucket has a fixed size, b, and is filled at a fixed rate of one token every $1/r$ seconds, where r is a predetermined value. When the bucket is filled with b tokens, the number of tokens in the bucket being referred to as the token depth, or fill depth, no more tokens are placed in the bucket. When a packet of size n arrives at the CMTS, if there are at least n tokens available in the token bucket (token depth>=n), for example, the packet is said to be conforming, and n tokens are taken out of the bucket (token depth reduced by n) and the packet is allowed to pass through the system. Thus, the token bucket functions as a sort of 'credit statement.' If there are not n tokens 'on deposit' when a packet of n bytes is received, the packet of n bytes is said to be non-conforming and may not be processed through the CMTS. A token bucket algorithm typically allows bursts of up to b bytes (if the bucket is full of tokens), but a constant output rate of conforming packets is generally regulated according to rate r.

If a packet is non-conforming, the system may, for example, drop the packet, or it can delay the packet until n tokens are available and the packet is then conforming. The former choice is typically referred to as policing the packets and the latter choice is typically referred to as shaping the packets.

The DOCSIS specification provides for a rate limit for packets on its service flows. The limit on the number of bytes forwarded (in bytes) during a time interval T is referred to as Max(T), and is described by the expression:

$$\text{Max}(T) = T*(R/8) + B. \qquad \text{Eq. 1}$$

The variable 'R' in Eq. 1 represents the Maximum Sustained Traffic Rate (in bits per second) and 'B' represents the Maximum Traffic Burst (in bytes). A conventional token bucket instantiation may be used to achieve the rate limitation as described by Eq. 1

Although effective in regulating the passing of large packets in a traffic flow stream, using a single token bucket to police or shape the traffic can result in a single service flow being allowed to use the entire bandwidth available while the token bucket is being emptied. This may decrease the advantage a service provider can promise with respect to higher performance in exchange for a higher subscription price when traffic is bursty and the predetermined Maximum Traffic Burst size value is large. Thus, there is a need for a method and system for increasing the regulation of bursty traffic flows that is typically provided by using a single token bucket. Furthermore, there is a need for a method and system for decreasing the bursts that comprise many small packets as opposed to one, or a few, large packets when using a token bucket for regulating a traffic flow while still regulating large packets.

BRIEF DESCRIPTION OF THE DRAWINGS

FIG. 3 is a flow diagram of a method for regulating traffic flow based on a peak traffic rate.

DETAILED DESCRIPTION

As a preliminary matter, it will be readily understood by those persons skilled in the art that the present invention is susceptible of broad utility and application. Many methods, embodiments and adaptations other than those herein described, as well as many variations, modifications, and equivalent arrangements, will be apparent from or reasonably suggested by the following description, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, aspects, adaptations, variations, modifications and equivalent arrangements, the present invention being limited only by the claims appended hereto and the equivalents thereof.

Figure 1:
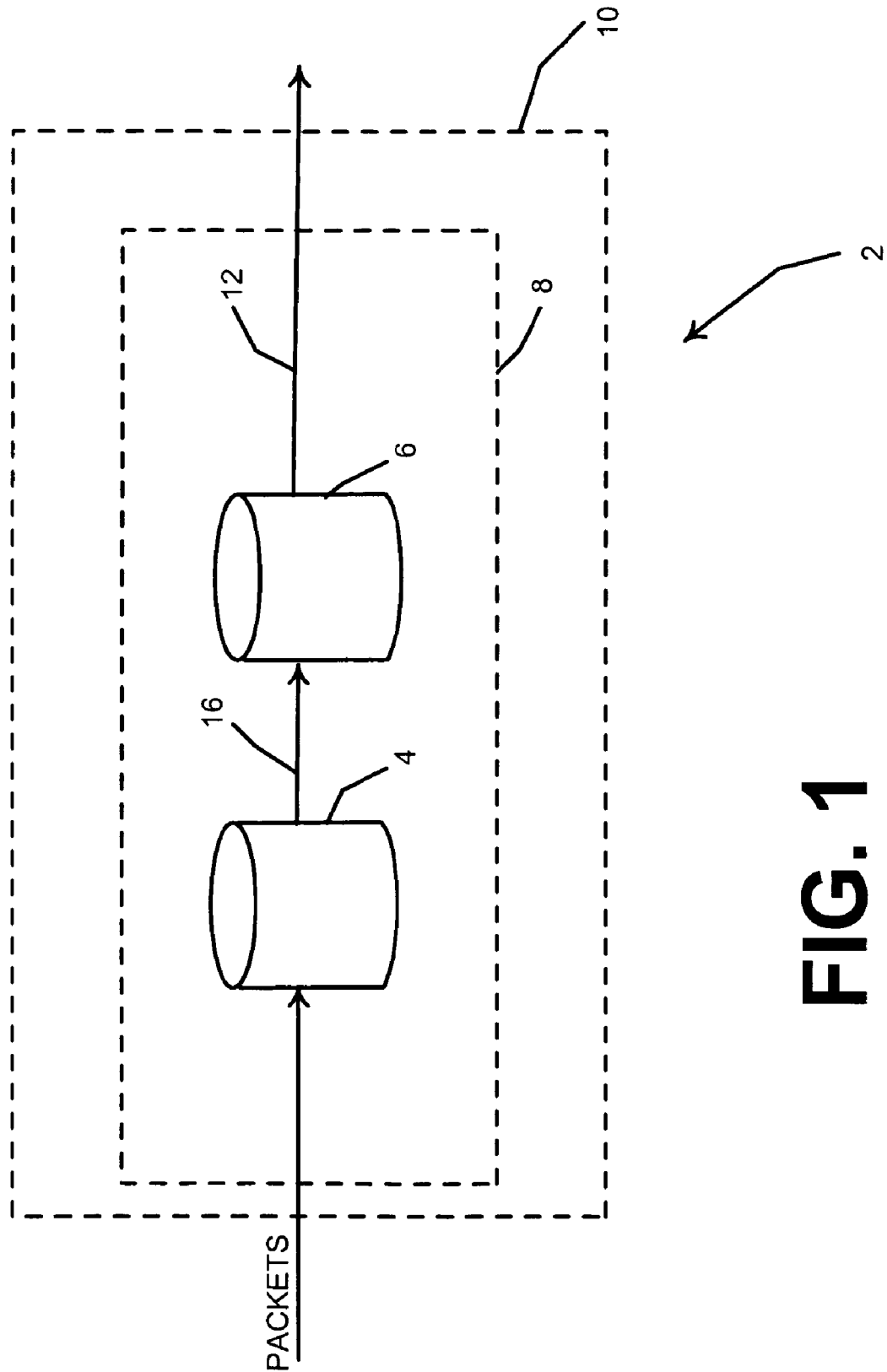
FIG. 1 illustrates a conceptual diagram showing two token buckets in series.

Turning now to the figures, FIG. 1 illustrates a conceptual diagram showing a system 2 of two token buckets in series. A second token bucket 4 complements a first token bucket 6 in a traffic regulation portion 8 of a CMTS 10. Second token bucket 4 facilitations limitation of the number of bytes forwarded (in bytes) in any time interval T by Peak(T) as described by the expression:

$$\text{Peak}(T) = T^*(P/8) + M. \qquad \text{Eq. 2}$$

P is Peak Traffic Rate (in bits per second) and M is a predetermined value for Maximum Packet Size. In a DOCSIS system Maximum Packet Size is specified as 1522 bytes. Instantiation of Eq. 2 may be realized using an additional token bucket with the size of the token bucket set to 1522 bytes. However, the additional token bucket size may be set to a lower value as will be discussed below. Packets processed through CMTS 10 exit from output 12.

As an instantiation example, traffic is first rate-limited to a predefined peak rate at second bucket 4 according to Eq. 2. After being policed and/or shaped to this rate, the traffic is then subjected to first token bucket 6, which may result in further policing and/or shaping of the traffic. In another embodiment, packets may be processed by the two token buckets in reverse order as compared to the order just described. In yet another embodiment, packets may be processed in parallel. In a parallel instantiation, tokens are available from both buckets simultaneously before traffic passes.

In an aspect, to prevent packets from bursting through second bucket 4 at a high rate for a short period of time, the predefined size of second bucket 4 may be to a value other than 1522. When second bucket 4 has a fixed size of 1522, it is possible to receive packets that are much smaller than the fixed size. Those small packets may then be allowed to leave the system at output 12 at full line rate (the rate at which they are received). By reducing the size of second bucket 4 from 1522 (the maximum size packet) to 0, the second token bucket may operate as a 'credit account' by allowing the current token depth to become a negative number as packets are passed.

If the number of tokens (token depth) in second bucket 4 is greater than, or equal to, zero when a packet is received then the packet is passed to bucket 6 as shown in FIG. 1, and the token depth in the second bucket is reduced by the byte size of the packet that was passed. Replenishment of second bucket 4 is performed according to a predefined token generation/replenishment rate. Thus, when a packet of size n is received at second bucket 4, for example, instead of checking to determine whether the bucket has n tokens available, a check is made to determine whether it is empty, i.e. that it has 0 tokens available (or more), but that the number of tokens in the bucket is not negative.

In an embodiment, bucket 4 will actually never have more than 0 tokens available if the size of the bucket is set to 0. Thus, when a packet is received at token bucket 4, and the token depth is zero, the packet is deemed conforming and allowed to pass, and n tokens are 'borrowed' from the token bucket, making the value of its token depth negative. Over time, tokens will be added to the bucket 4 at a predetermined replenish rate, thus repaying the 'debt.' If bucket 4 receives a packet while it has a negative value, meaning that the debt hasn't been repaid yet, the packet is deemed non-conforming, and is dropped or delayed until it is deemed to be conforming, depending on predetermined non-conforming-packet criteria. After a packet has been processed through second bucket 4, the packet may be further processed by first token bucket 6.

Figure 2:
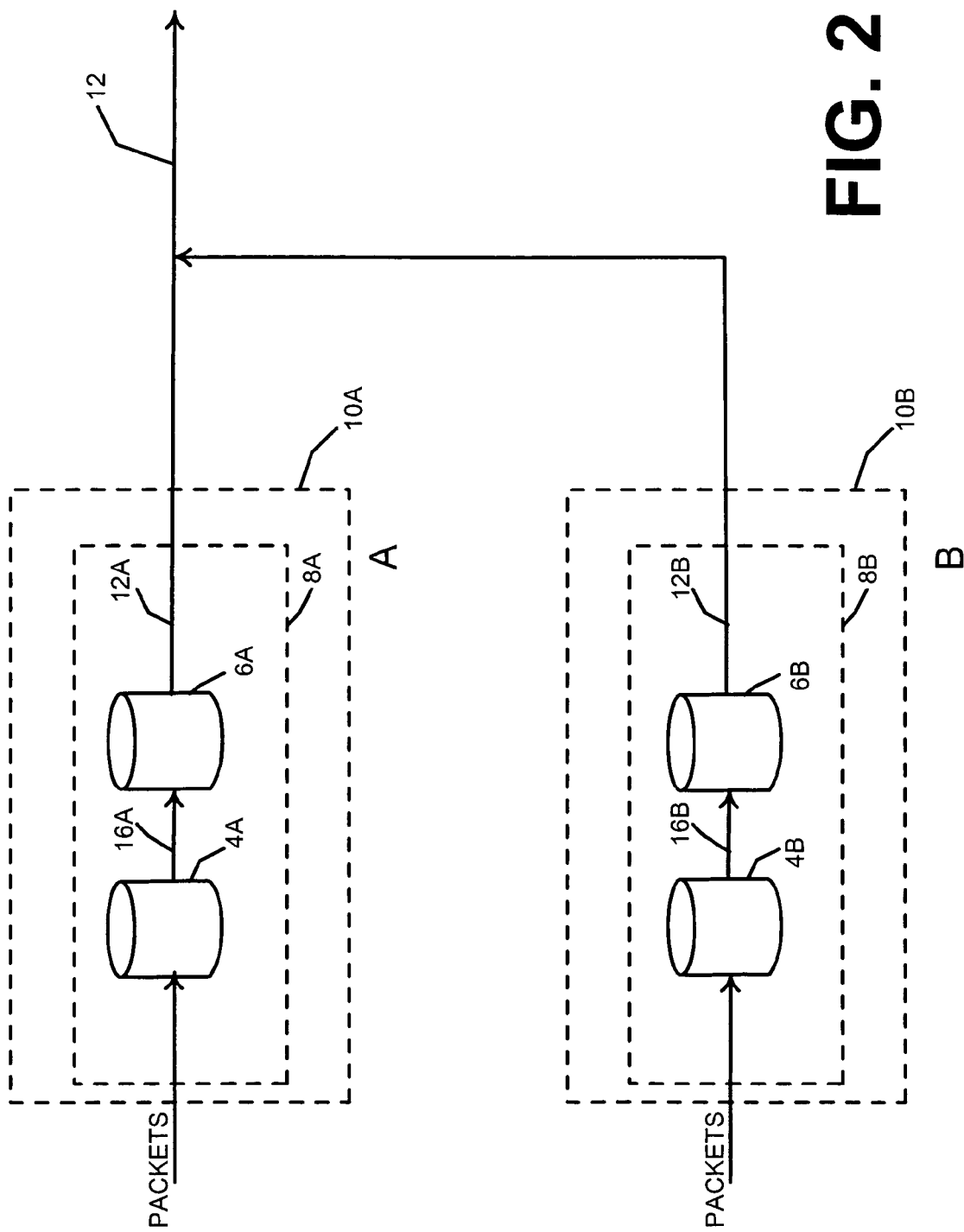
FIG. 2 illustrates a conceptual diagram showing two token buckets in series for each of two separate user traffic flows.

By using second bucket 4 with first bucket 6, smaller packets that would probably always pass through first bucket 6 without delay may be delayed. If only first token bucket 6 is operative and has a bucket size set to 1522, or larger, small packets typically all get scheduled back to back preventing large packets from getting scheduled in between them. Moreover, the effect of packets of one user being blocked from immediate scheduling is even more pronounced when two flows are both transmitting many small packets. As an example, FIG. 2 shows service flows associated with two users, A & B, that are simultaneously transmitting packets. One user-flow is allowed to use a given amount of bandwidth and the other user-flow is allowed a higher bandwidth defined as double the first user's allocated bandwidth. Assume the first user bursts a number of small packets followed immediately by a burst of small packets from the second user. With a first bucket 6 size of 1522, or larger, for both users A and B, combined output 12 will include all of the first user's packets followed by all of the second user's packets.

However, by using second bucket 4 for both users A and B with a bucket size of zero, packets will interleave, with one packet from the first, then two from the second, then another one from the first, two from the second, etc.

This provides the advantage that one user, or a small number of users, does not usurp a disproportionate amount of bandwidth on a channel by having their small packets scheduled ahead of another's larger packets that might otherwise be delayed longer than smaller packets that arrived later. Such usurpation can occur when users other than the ones sending many small size packets are attempting to send medium packets and large packets. Small (typically 64 bytes), or medium sized packets (typically in the 100-1000 bytes range), tend to keep the current number of tokens in bucket 6 shown in FIG. 1 fewer than 1522 if the replenish rate is not set high enough. The result can be that user B in FIG. 2 may pay a premium subscription rate with respect to user A, but user B's large packets may actually obtain slower throughput than user A that pays less for service and tends to transmit and receive many small packets.

Accordingly, using second bucket 4 in conjunction with first bucket 6 may cause a packet to be buffered, or stored temporarily, until the number of tokens, or token depth, in the second bucket is replenished to at least zero. Thus, the passing of small and large packets alike may be regulated by second bucket 4, whereas using just first bucket 6 alone would tend to only regulate the passing of large packets. Moreover, setting the size of second token bucket to zero will tend to slow down the passage of small packets. A zero size setting for second bucket 4 may be useful in regulating traffic flows for users whose traffic patterns tend to transmit and receive many small packets with respect to the number of medium and/or large packets vis-à-vis others who tend to more often transmit and receive medium and/or large packets.

It will be appreciated that the interconnected buckets shown in FIG. 1. are a conceptual representation of algorithms that may be implemented in software, firmware, such as field programmable gate arrays ("FPGA"), or hardware. Furthermore, it will be appreciated that the buckets shown in the figure are typically under the control of a central processor at a CMTS, or a cable modem (not shown in the figure). The interconnection of the buckets shown in the figure may not necessarily be physical connections over which signals pass (although they may be), but rather may represent routing of packets according to an algorithm controlled by the central processor. Thus, criteria may be applied at the inputs and outputs of the buckets to regulate packets based on predetermined criteria.

It will be appreciated that the above-described aspects have primarily described in reference to downstream packets being processed at a CMTS communication device for transmission to a user communication device, such as a cable modem or eMTA device. However, the same principles as those described above may also be applied at a cable modem, or eMTA, for packets to be transmitted to a CMTS.

Furthermore, while the aspects described above have been described in reference to a CMTS that is part of a cable broadband data system, the aspects are equally applicable to any broadband data system, such as, for example, a DSL system or an ATM system. In addition, it will be appreciated that some terms, or phrases, such as token bucket, are instantiations that refer to abstract, conceptual and/or logical aspects that may be implemented using software, firmware, or hardware components.

Turning now to FIG. 3, a flow diagram showing a method 300 for regulating traffic flow from a communication device based on a maximum sustained traffic rate is shown. Method 300 starts at step 305 where the maximum bucket size of a token bucket instantiation is set to a predetermined value. In the preferred embodiment, the maximum bucket size is set to zero. However, other values for bucket size may be used as determined by an operator. A timer is set at step 310 to run for a predetermined period. The higher the predetermined period value, the longer the timer runs before expiring and the less frequently token depth will be automatically incremented.

At step 315, a determination is made whether the timer has expired or not. If the timer process has not expired as determined at step 315, the timer process returns to step 315. If a determination is made at step 315 that the timer has expired, a determination is made at step 316 whether the current token depth is less than zero. If the current token depth is less than zero, as determined at step 316, the token depth is incremented at step 317 by a predetermined amount of tokens. The timer restarts at step 318 to the same predetermined period set at step 310. Returning to discussion of step 316, if a determination is made that the current token depth is not less than zero, the timer resets at step 318. The timer process 319, which collectively includes steps 315-318 as shown by the dashed outline surrounding said steps, returns to step 315 after resetting at step 318.

Returning now to discussion of process 300 following step 310, a determination is made at step 320 whether a new packet has arrived at the communication network device where method 300 is operating. If a new packet is not detected at step 320, method 300 returns to step 320. It will be appreciated that 'bus bar' 322 is used to facilitate illustration of timer process 319 operating concurrently with the remainder of method 300. Thus, bus bar 322 illustrates a common place in the method rather than necessary connectivity between steps. For example, it is noted that control of method 300 does not pass from step 320 to step 315 of timer process 319. Rather, timer process 319 operates independently of the other steps of method 300 after step 310.

Returning to discussion of step 320, if a new packet is detected at step 320, the packet is received at step 325. At step 330, a determination is made whether current token depth of the token bucket is greater than, or equal to, zero. It will be appreciated that the comparison at step 330 to zero is made if zero is the value set at step 305. However, if the maximum bucket size is set to another value at step 305, the comparison at step 330 is made with respect the other value. It is also noted that after incrementing the token depth at step 317, the current updated token depth value from timer process 319 is used at step 330 as shown by the broken line between steps 317 and 330.

If the result of the determination at step 330 is that the current token depth in the bucket is greater than, or equal to, zero, the packet being evaluated is deemed conforming and method 300 advances to step 340. The packet being evaluated is processed at step 340 according to criteria for conforming packets, such conforming-packet-criteria typically being to pass the packet from the communication device where method 300 is operating. Method 300 subtracts the size of the packet processed at step 340 from the current token depth at step 345. It will be appreciated that the subtraction at step 345 may result in the current token depth being a negative value. This will be the case when the maximum value set at step 305 is zero, unless the packet size is also zero. After the subtraction at step 345, method 300 returns to step 320 to evaluate whether a new packet has arrived.

Returning to discussion of the determination at step 330, if a determination is made that the current token depth is not greater than or equal to zero, method 300 advances to step 335. The packet being evaluated is deemed to be non-conforming and is processed at step 335 according to criteria to be applied to non-conforming packets. Such non-conforming-packet criteria may include discarding the packet, buffering the packet for a predetermined period, or other traffic regulating technique. After processing at step 335, method 300 returns to step 320. Thus, the advantage is provided by the aspects described above that even small packets may be regulated by being discarded, or at least delayed, when the number of bytes that would be passed by the packets in a given period exceeds the rate at which the current token depth is incremented.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A system operable to regulate packet flow in a traffic stream at a network device using a token bucket, comprising:
   an interface operable to receive a packet of the traffic stream at the network device;
   a packet processing module operable to process the packet received by the network device if the current token depth of the token bucket is greater than or equal to zero, even if the current token depth is less than the size of the packet, the processing module being further operable to decrease the current token depth of the token bucket based upon forwarding the packet and to increase the current token depth of the token bucket at a predetermined rate; and
   wherein the token bucket is connected in series to another token bucket to further facilitate regulation of the traffic stream.

2. The system of claim 1, wherein the packet processing module is further operable to delay processing of the packet if the current token depth of the token bucket is less than zero.

3. The system of claim 1, wherein the packet processing module is further operable to drop the packet if the current token depth of the token bucket is less than zero.

4. The system of claim 1, wherein the current token depth of the token bucket is decreased by the size of the packet processed.

5. The system of claim 4, wherein the current token depth of the token bucket is operable to be a negative token depth when the size of the data packet processed is greater than the current token depth.

6. The system of claim 1, wherein the current token depth of the token bucket is decreased by one for each byte in the packet passed.

7. The system of claim 1, wherein the packet processing module is operable to initialize the token bucket size prior to processing a first incoming packet.

8. The system of claim 1, wherein the packet processing module is operable to process the packet according to conforming criteria based upon the token bucket depth classifying the packet as conforming, and the packet processing module being operable to process the packet according to non-conforming criteria based upon the token bucket depth classifying the packet as non-conforming.

9. A method of regulating the flow of packets in a traffic stream at a network device using a token bucket, comprising:
  receiving a packet of the stream at the network device;
  processing the packet from the network device if the current token depth of the token bucket is greater than or equal to zero, even if the current token depth is less than the size of the packet;
  decreasing the current token depth of the token bucket based upon processing the packet;
  incrementing the current token depth of the token bucket at a predetermined rate;
  wherein the token bucket is connected in series to another token bucket to further facilitate regulation of the traffic stream.

10. The method of claim 9, further comprising delaying processing of the packet if the current token depth of the token bucket is less than zero.

11. The method of claim 9, further comprising dropping the packet if the current token depth of the token bucket is less than zero.

12. The method of claim 9, further comprising decreasing the current token depth of the token bucket by the size of the packet processed, if the packet is processed.

13. The method of claim 12, wherein the current token depth of the token bucket is operable to be a negative token depth when the size of the data packet processed is greater than the current token depth.

14. The method of claim 9, further comprising decreasing the current token depth of the token bucket by one for each byte in the packet processed.

15. The method of claim 9, wherein the packet processing module is operable to initialize the token bucket size prior to processing a first incoming packet.

16. The method of claim 9, further comprising:
  processing the packet according to conforming criteria based upon the token bucket depth classifying the packet as conforming; and
  processing the packet according to non-conforming criteria based upon the token bucket depth classifying the packet as non-conforming.

17. One or more computer-readable media having instructions stored thereon, the one or more computer readable media, when executed by a processor, being operable to cause the processor to perform operations comprising:
  receiving a packet of the stream at the network device;
  processing the packet from the network device if a current token depth of a token bucket is greater than or equal to zero, even if the current token depth is less than the size of the packet;
  decreasing the current token depth of the token bucket based upon processing the packet;
  incrementing the current token depth of the token bucket at a predetermined rate;
  wherein the token bucket is connected in series to another token bucket to further facilitate regulation of the packet of the stream.

* * * * *